United States Patent
Levandovsky et al.

(10) Patent No.: US 7,095,956 B2
(45) Date of Patent: Aug. 22, 2006

(54) METHOD AND APPARATUS FOR VALIDATING A PATH THROUGH A SWITCHED OPTICAL NETWORK

(75) Inventors: Dmitry Levandovsky, Northbrook, IL (US); Srinivas V. Makam, Naperville, IL (US); Vishal Sharma, San Jose, CA (US)

(73) Assignee: Tellabs Operations, Inc., Naperville, IL (US)

(*) Notice: Subject to any disclaimer, the term of this patent is extended or adjusted under 35 U.S.C. 154(b) by 959 days.

(21) Appl. No.: 09/878,092

(22) Filed: Jun. 8, 2001

(65) Prior Publication Data

US 2002/0063915 A1 May 30, 2002

Related U.S. Application Data

(60) Provisional application No. 60/210,211, filed on Jun. 8, 2000.

(51) Int. Cl.
*H04B 10/08* (2006.01)
*H04B 17/00* (2006.01)
*H04J 14/00* (2006.01)

(52) U.S. Cl. ............... 398/27; 398/26; 398/25; 398/45; 398/57

(58) Field of Classification Search ........... 398/14, 398/16, 26, 27, 34, 45, 55, 57
See application file for complete search history.

(56) References Cited

U.S. PATENT DOCUMENTS 6,259,543 B1 * 7/2001 Golovchenko et al. ....... 398/26

6,728,484 B1 * 4/2004 Ghani ................... 398/42

OTHER PUBLICATIONS

Agrawal, G., "Multichannel Lightwave Systems"; Fiber Optic Communication Systems; 1997 pp. 284-417, John Wiley & Sons, Inc.; New York, NY.

Forghieri, F. et al., "Fiber Nonlinearities and Their Impact on Transmission Systems"; Optical Fiber Telecommunications III A; 1997, pp. 196-264; Academic Press, San Diego, CA.

Ramamurthy, B., et al., "Impact of Transmission Impairments on the Teletraffic Performance of Wavelength-Routed Optical Networks", Journal of Lighwave Technology, vol. 17, No. 10., Oct. 1999, pp. 1713-1723.

Sabella, R. et al. "Impact of Transmission Performance on Path Routing in All-Optical Transport Networks" Journal of Lightwave Technology, vol. 16, No. 11, Nov. 1998, pp. 1965-1971.

Sun, Y., et al., "Analytical formula for the transient response of erbium-doped fiber amplifiers", Applied Optics, vol. 38, No. 9, Mar. 1999, pp. 1682-1685.

Tkach, R. W., et al., "Fundamental limits of optical transparency"; OFC '98 Technical Digest; pp. 161-162.

* cited by examiner

*Primary Examiner*—M. R. Sedighian
*Assistant Examiner*—Nathan Curs
(74) *Attorney, Agent, or Firm*—Tellabs Law Dept.; Lawrence M. Cho

(57) ABSTRACT

A method for validating a path through a switched optical network is disclosed. A bit error rate at the end of the path is determined. The path is validated if the bit error rate is within a predefined range.

7 Claims, 4 Drawing Sheets

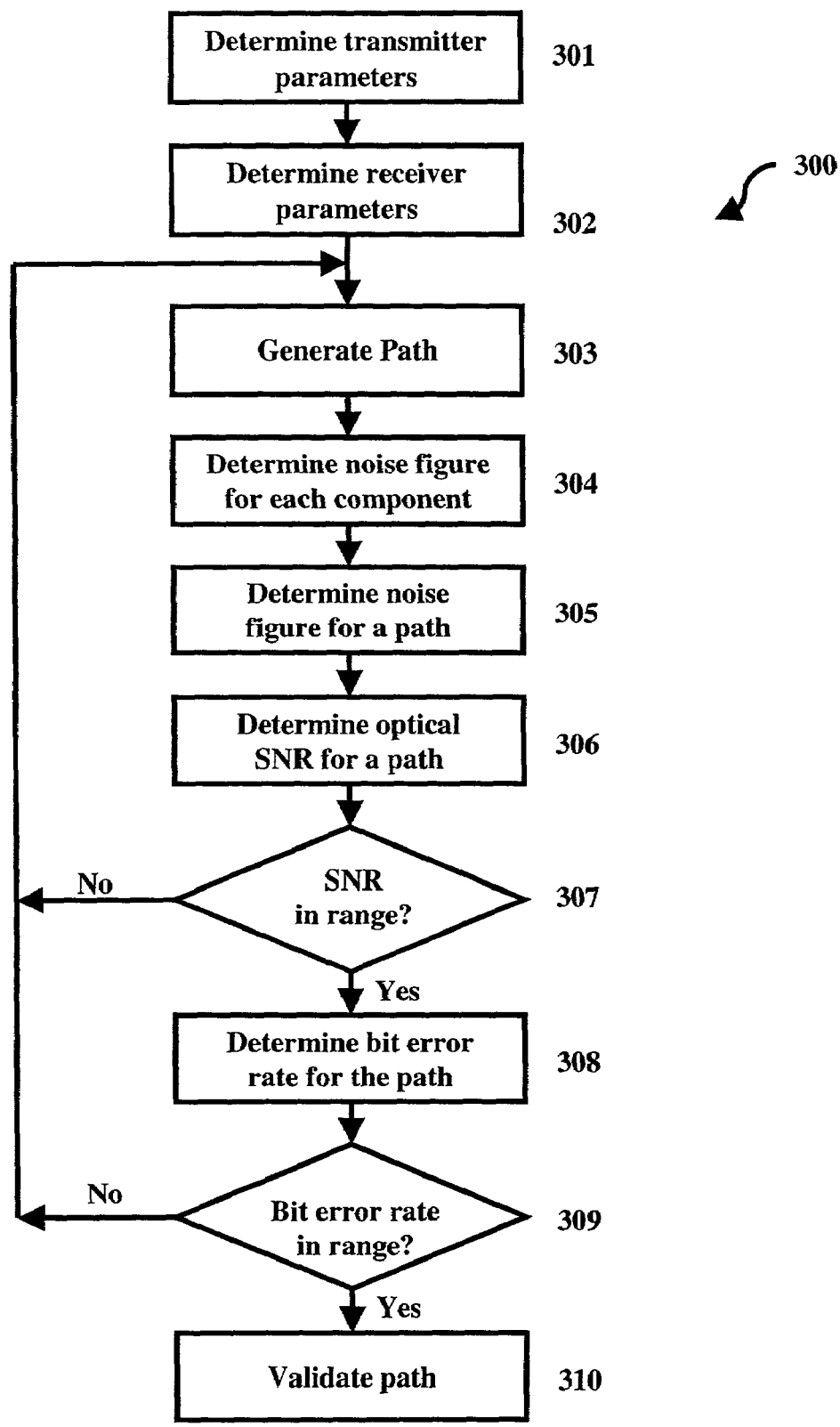

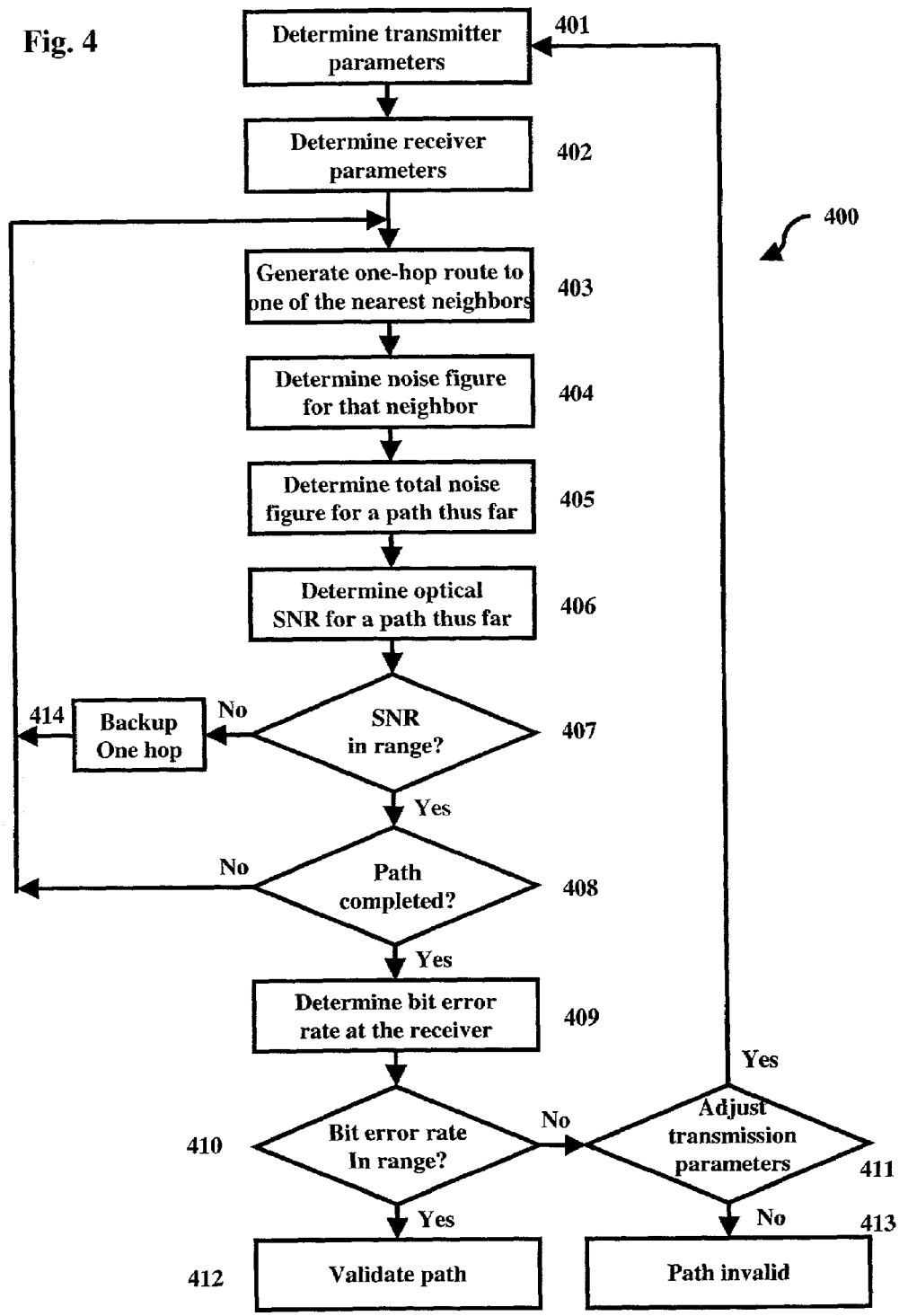

METHOD AND APPARATUS FOR VALIDATING A PATH THROUGH A SWITCHED OPTICAL NETWORK

This application claims the benefit of Provisional application Ser. No. 60/210,211 filed June 8, 2000.

FIELD OF THE INVENTION

The present invention relates to switched optical networks. More specifically, the present invention relates to a method and apparatus for the validation and selection of light paths through a switched optical network.

BACKGROUND

Activity in the optics industry has been directed towards the development of a Wavelength-Division-Multiplexed (WDM) Automatically Switched Optical Network (ASON), which allows client network devices such as IP routers and ATM switches to automatically request bandwidth from the network when the need arises. Light-path (i.e., wavelength) connections in an ASON environment may be required to traverse a number of fiber links. These links may include optical amplifiers (OAs) and optical cross-connects (OXCs) which add noise and distort signal-bearing light pulses. Thus, the network is faced with the problem of delivering an acceptable level of performance for the connection.

One approach to address the quality of service for a connection is to architect a network topology such that every reasonable physically realizable light path delivers an adequate level of performance with little or no impact on every other light-path. Such a paradigm is known as "Islands-of-Transparency", since the ASON is divided into a set of smaller sub-networks or "islands". Within these sub-networks, paths are capable of delivering some universally acceptable quality of service. The sub-networks are required to be interconnected via optical-electronic-optical cross-connects (OEO-OXCs) which are capable of regenerating the signals in the electronic domain, thereby reducing undesirable optical transmission impairments. Network clients that reside in different sub-networks are required to establish paths through the OEO-OXCs regardless of their physical proximity. The large number of OEO-OXC devices that are required to support the "Island of Transparency" network topology make the topology costly to implement.

Thus, what is required is a method and apparatus for determining selecting and validating a path/connection through a switched optical network that is capable of delivering an acceptable level of performance that is both efficient and economical.

SUMMARY

A method for validating a path through a switched optical network according to a first embodiment of the present invention is disclosed. A bit error rate for the path is determined. The path is validated or admitted into the network if the bit error rate is found to be within a predefined range.

A second method for validating a path route through a switched optical network according to a second embodiment of the present invention is disclosed. A cumulative optical signal to noise ration (SNR) at the output of every element along the path is determined while the path is being set up. The path's route is modified if the SNR at the output of any element on the path is outside a predefined range. The path is validated or admitted into the network if the bit error rate is within a predefined range.

A path validation unit is disclosed according to an embodiment of the present invention. The path validation unit includes a bit error rate processor that determines a bit error rate of a path through a switched optical network.

BRIEF DESCRIPTION OF THE DRAWINGS

The features and advantages of the present invention are illustrated by way of example and are by no means intended to limit the scope of the present invention to the particular embodiments shown, and in which:

FIG. 3 is a flow chart illustrating a method for validating a path route through a switched optical network according to the first embodiment of the present invention; and FIG. 4 is a flow chart illustrating a method for validating a path route through a switched optical network according to the second embodiment of the present invention.

DETAILED DESCRIPTION

In the following description, for purposes of explanation, specific nomenclature is set forth to provide a thorough understanding of the present invention. However, it will be apparent to one skilled in the art that these specific details may not be required to practice the present invention. In other instances, well-known circuits and devices are shown in block diagram form to avoid obscuring the present invention unnecessarily.

Figure 1:
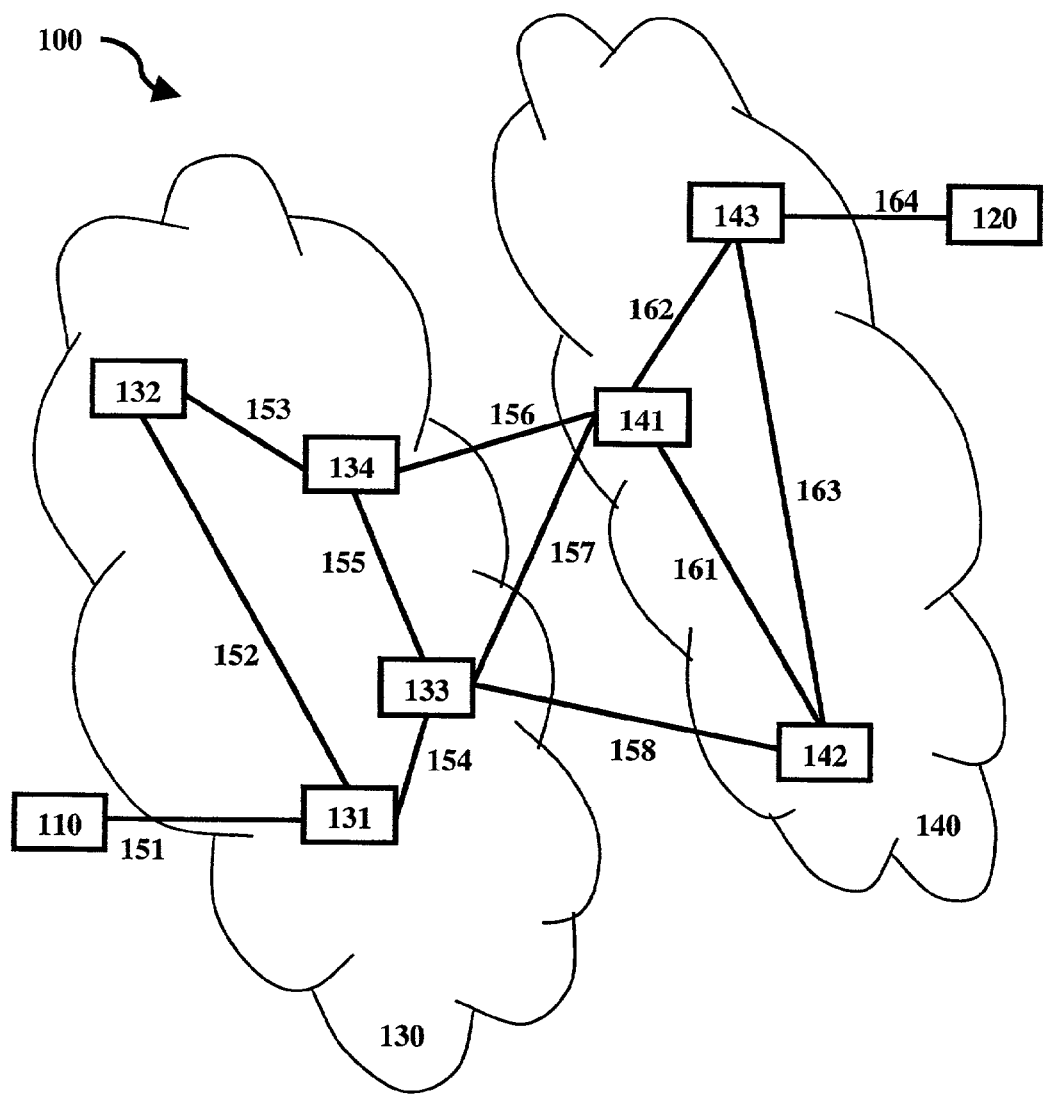
FIG. 1 is a block diagram of an optical network utilizing an embodiment of the present invention.

FIG. 1 is a block diagram illustrating an optical network 100 utilizing an embodiment of the present invention. The optical network 100 is a switched optical network that includes a first sub-network 130 and a second sub-network 140. The first and second sub-networks 130 and 140 include a plurality of elements such as cross-connects, regenerators, optical amplifiers, wavelength multiplexors, optical fiber links and other network elements that transmit, route, and process optical signals. Blocks 131–134 and 141–143 may represent optically transparent photonic cross-connects (PXCs) or Add/Drop Multiplexors (OADMs) or Optical-Electronic-Optical cross-connects (OEO-OXCs) or Add/Drop Multiplexors (OEO-ADMs) in the optical network 100. Lines 151–157 and 161–164 may represent optical fiber links, regenerators, optical amplifiers or other devices in the optical network 100 that connect various OXCs and ADMs to one another. Blocks 110 and 120 represent clients that request a path connection through the optical network 100. The clients may be IP routers, ATM switches or other devices.

According to an embodiment of the optical network 100, blocks 134 and 141 represent OEO-OXCs or OEO-ADMs. Such OEO devices include OEO transducers that are used to regenerate an optical signal in electrical domain and, subsequently, convert it back to an optical signal that may be transmitted to the next device. By terminating an optical signal and converting it to an electrical signal, optical impairments in the optical signal may be reduced or eliminated. OEO-OXCs and OEO-ADMs, however, are more costly to implement than PXCs and OADMs, respectively. Thus, it is desirable to allocate OEO-OXC and OEO-ADM functionality in an economical manner.

According to an embodiment of the present invention, the optical network 100 includes a path validation unit (not shown) that checks a proposed path route through a network to determine whether an optical signal through the path may be provided with sufficient quality of service. The path validation unit calculates a bit error rate of the path through the optical network 100. If the bit error rate is within a specified range that is associated with an acceptable level of quality of service, the path is judged valid. If the optical network were operated according to the "Islands-of-Transparency" route selection rules, optical signals that do not originate and terminate in the same sub-network would be required to be terminated and converted to electric signals at an OEO-OXC or OEO regenerator or OEO-ADM before being transmitted between the sub-networks in order to ensure adequate quality of service. By determining the bit error rate of a proposed path, the path validation unit allows paths that travel between sub-networks that do not traverse an OEO device to be utilized without sacrificing quality of service. The path validation unit is capable of determining whether or not a given path between two network clients may be established transparently (without converting the optical signal to an electrical signal) with the desired quality of service. If no transparent path exists, a route may be created that traverses an OEO device, such as an OEO-OXC. The path validation unit, in effect, transforms a plurality of sub-networks into a single network with end-to-end transparent connectivity.

According to an embodiment of the present invention, the path validation unit may be implemented in a central connection controller or a plurality of central connection controllers (not shown) that is assigned to the network or each sub-network. Alternatively, the path validation unit may be implemented in any one or all of the cross-connects or ADMs in the optical network 100. FIG. 1 illustrates an exemplary optical network 100 with wavelength routing network elements (NEs) 131–134 and 141–143 and links 151–157 and 161–164. It should be appreciated that the present invention may be implemented in a network having any number of NEs and links.

Figure 2:
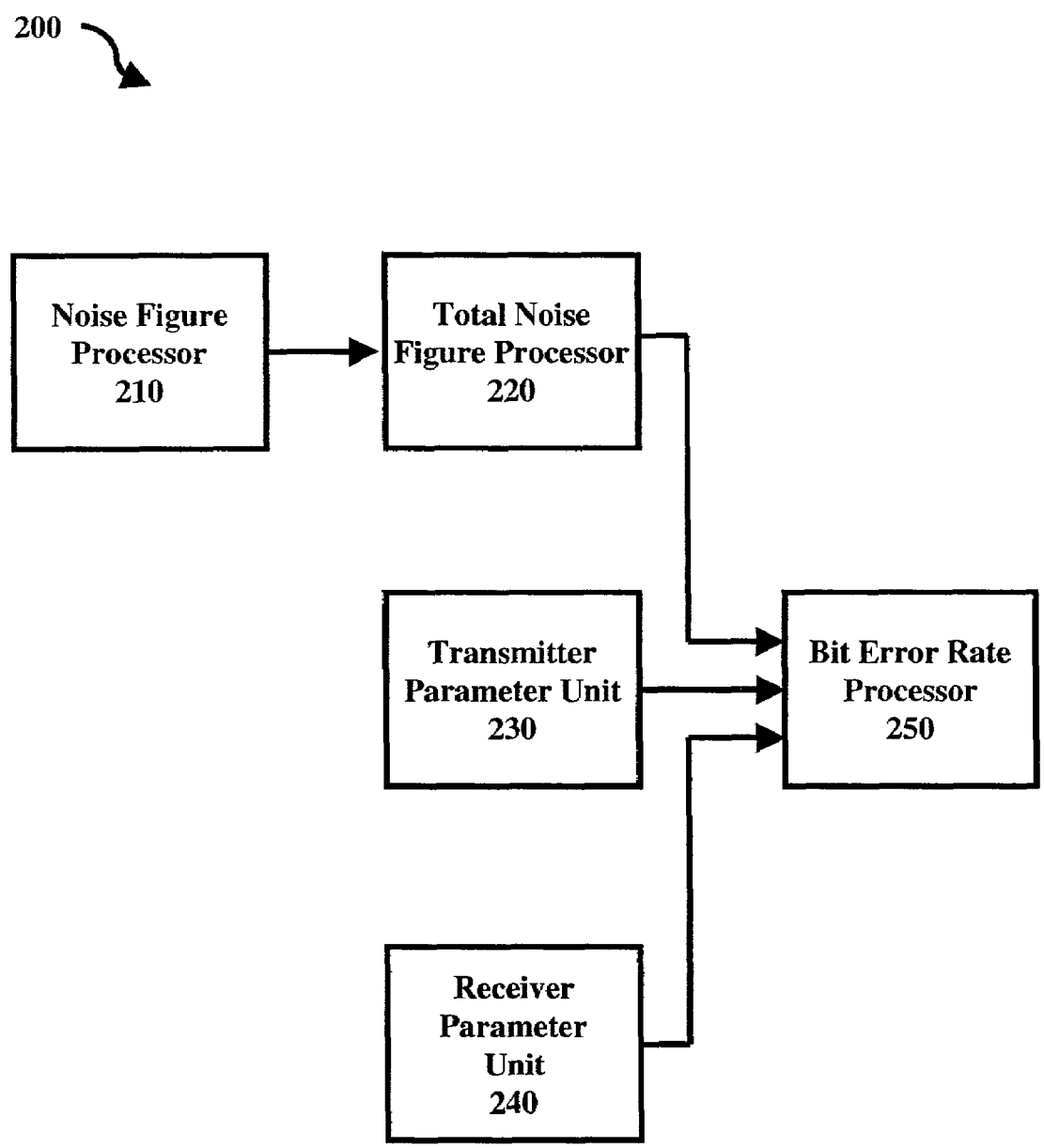
FIG. 2 is a block diagram of a path validation unit according to an embodiment of the present invention.

FIG. 2 illustrates a block diagram of a path validation unit 200 according to an embodiment of the present invention. In a preferred embodiment of the present invention, the path validation unit 200 is implemented by software and resides in a memory (not shown) as a sequence of instructions. It should be appreciated that the path validation unit 200 may also be implemented using hardware or a combination of both hardware and software.

The path validation unit 200 includes a noise figure processor 210. The noise figure processor 210 determines a noise figure for each element in a path. Elements may include any NE or link in the path. According to an embodiment of the path validation unit 200, the noise figure for each element i is determined based on an equivalent average number of noise photons per bit at an input of the element $n_i^{eq}$, an average number of photons per bit at the output of the previous element $<n_{i-1}>$, an optical power gain of the element $G_i$, a constant $V_i$ related to deviation of statistical noise distribution, and a number of modes M detectable by the receiver at an end of the path.

According to one embodiment of the present invention, $n_i^{eq}$ is the equivalent average number of noise photons per bit at the input of the "i-th" link: $n_i^{eq} \equiv <N_i>/G_i = n_i^{sp} + 1/G_i$ with $<N_i>$ as the per mode amplified average spontaneous emission photon number, and $n_i^{sp}$ is commonly referred to as the OA's spontaneous emission factor, which is equal to 1 for an ideal amplifier (with complete medium inversion). Average number of photons at the "i-th" input, which equals the average number of photons at the "(i−1)st" output, may be computed recursively $<n_{i-1}> = G_{i-1}(<n_{i-2}> + n_{i-1}^{eq})$ with $<n_1> = G_1(<n_0> + Mn_1^{eq})$ where $<n_0>$ is the average number of photons per bit out of the transmitting laser. In this embodiment, the noise figure for an element may be computed as follows $NF_i^{Poisson} = 2n_i^{eq} + 1/G_i + [1 + n_i^{eq}V_iG_i][Mn_i^{eq}/(G_i<n_{i-1}>)]$.

The path validation unit 200 also includes a total noise figure processor 220. The total noise figure processor 220 receives the noise figures for elements on the path and generates a total noise figure for those elements. According to an embodiment of the validation unit 200, the total noise figure processor 220 generates a total noise figure based on the noise figures of all individual element on the path. According to an embodiment of the present invention the total noise figure for a path may be computed as follows $NF_i^{Total} = NF_{i-1}^{Total} + A_{i-1}(NF_i^{Poisson} - 1)$, where $A_i \equiv A_{i-1}(g_i/G_i)$ is also defined recursively with excess noise factor $g_i = 1 + M(n^{ieq}/<n_{i-1}>)$. Initially, $NF_0^{Total} = 1$ and $A_0 = 1/F_0$, where $F_0$ is the Fano factor of light out of the transmitting laser ($A_0 = 1$ for a shot-noise limited source). The optical SNR at the receiver is given by $SNR_k = NF_k^{Total}/SNR_0$ for a path containing a chain of k elements. In this embodiment, the entire signal path from the source transmitter (client 110 shown in FIG. 1) to the destination receiver (client 120 shown in FIG. 1) is viewed as a chain of lumped or distributed elements whose emission and absorption coefficients follow periodic distribution along the path. Power loss is incorporated in this model by allowing the element's optical power gain $G_i$ to dip below the value of one ("i" indicates the element's position in the chain). The net contribution of all the nonlinear interactions (and the spontaneous emissions inside elements) is reflected in the degradation of the optical SNR. The noise propagation problem is solved via linearization approximation around the average powers that are computed by routing software for components in the path. Since in a WDM-enabled ASON a new circuit, which traverses the same physical link, may be turned on at any time, the worst case assumptions is used regarding presence of other WDM-channels on every link of interest. In such a linearized model the noise contribution of every transmission or switching element is summarized by its optical Noise Figure $NF_i^{Poisson} = SNR_{in}^{Poisson}/SNR_i$, where $SNR_i$ is the SNR at the output of the "i-th" element. Since the optical SNR evolves along the path, $NF_i$ is defined with respect to a consistent state of noise on the input, thus making $NF_i$ independent of its position in the chain, i.e., a true device parameter. A shot-noise limited (i.e., Poissonian) input signal is assumed in the definition of $SNR_{in}^{Poisson}$, which is equal to the average number of photons per bit at the input to element "i". With this definition a modified Friis' formula for a cumulative noise figure, which summarizes noise performance of a series connection of optical elements "1" through "i" is derived. This may be written recursively as shown above.

The path validation unit 200 includes a transmitter parameter unit 230. The transmitter parameter unit 230 contains or obtains information in connection with the transmitting clients connected to the network, such as the transmitter optical SNR (i.e., $SNR_0$) and Fano factor, transmitter signal power $<n_0>$, and other relevant parameters.

The path validation unit 200 includes a receiver parameter unit 240. The receiver parameter unit 240 contains or obtains information in connection with the receiving clients connected to the network such as the required power of a signal at the receiving client, receiver bandwidth and responsivity, number of modes M, thermal noise, decision threshold and other relevant parameters.

The path validation unit 200 includes a bit error rate processor 250. The bit error rate processor 250 is coupled to the total noise figure processor 220, the transmitter parameter unit 230, and the receiver parameter unit 240. The bit error rate processor 250 generates an estimated optical SNR (i.e., $SNR_k$) and bit error rate at the receiver for a path route based on the total noise figure received from the total noise figure processor 220, transmitter parameters received from the transmitter parameter unit 230, and detection parameters received from the receiver parameter unit 240.

The optical network 100 shown in FIG. 1 may utilize a topology distribution protocol, such as OSPF or IS—IS that are in common use in IP networks and are proposed for use in optical networks as well, in routing paths through the optical network 100. In this embodiment, physical parameters for elements in the network, such as the equivalent average number of noise photons per bit at an input of an element $n_i^{eq}$, the optical power gain of an element $G_i$, and the constant $V_i$ related to deviation of the statistical noise distribution, etc. of an element, may all reside in a central connection controller that resides in any one or a plurality of NEs in the optical network 100 or in one or more centrally-located connection controllers that reside external to any NE. The connection controller incorporates the functionality of the path validation unit 200, as described above.

Alternatively, the optical network 100 may utilize a signaling protocol such as RSVP or CR-LDP that are in common use in IP networks and are proposed for use in optical networks as well in establishing paths through the optical network 100. In this second embodiment, characteristics for an element, such as the equivalent average number of noise photons per bit at an input of the element $n_i^{eq}$, the optical power gain of the element $G_i$, and the constant $V_i$ related to deviation of the statistical noise distribution of the element, etc., are not distributed to a centralized connection controller in the network. Instead, each NE includes a path validation unit that calculates a noise figure for itself and, perhaps, any component connected to it that is not capable of calculating its noise figure. In this embodiment, a total noise figure for a path may be calculated by each NE on a path route using cumulative noise-related information received from a previous element on the path. If the resulting optical SNR or the bit error rate at an output of an element along the path falls outside a predefined range, the path's route may be modified during the path establishment phase.

It should be appreciated that in evaluating a potential path through the network, the path validation unit 200 will also consider other criteria such as criteria that affect the shape of propagating optical pulses. The path validation unit 200 may consider, for example, self-phase modulation, group velocity dispersion, polarization mode dispersion, optical amplification transient-suppression performance, and other criteria that affect the shape of the optical signal pulses.

FIG. 3 is a flow chart illustrating a method for validating a path through a switched optical network according to a first embodiment of the present invention.

At step 301, parameters at the transmitter are determined. According to this embodiment of the present invention, transmitter's average number of photons per bit $<n_0>$ and optical $SNR_0$ and Fano factor are determined in addition to pulse-shape related information, which may include modulation format, pulse chirp, etc.

At step 302, parameters at the receiver are determined. According to an embodiment of the present invention, the parameters at the receiver include the required optical SNR (and the corresponding bit error rate, which depends on pulse-shape integrity and power, detector bandwidth and thermal noise properties, decision threshold, etc.) and the number of detected modes M for a given bit rate connection in addition to pulse-shape related requirements, which include signal power, modulation format, pulse-shape integrity, etc. At step 303, a path route through a switched optical network is generated. The path route may be generated using any known route-generating algorithm. If no more paths can be generated the path connection fails (not shown in FIG. 3).

At step 304, a noise figure is determined for each element on the path. According to an embodiment of the present invention, the noise figure for each element i is determined based on physical parameters: equivalent average number of noise photons per bit at an input of the element $n_i^{eq}$, an average number of photons per bit at an output of the previous element $<n_{i-1}>$, an optical power gain of the element $G_i$, a constant $V_i$ related to deviation of the statistical noise distribution, and a number of modes M detectable at an end of the path. According to an embodiment of the present invention, the noise figure for an element may be computed as $NF_i^{Poisson} = 2n_i^{eq} + 1/G_i + [1 + n_i^{eq} V_i G_i][Mn_i^{eq}/(G_i <n_{i-1}>)]$.

At step 305, a total noise figure is determined for the path route based on the noise figure for each element of the route. According to an embodiment of the present invention, the total noise figure is computed as $NF_i^{Total} = NF_{i-1}^{Total} + A_{i-1}(NF_i^{Poisson} - 1)$, where $A_i \equiv A_{i-1}(g_i/G_i)$ is also defined recursively with excess noise factor $g_i = 1 + M(n_i^{eq}/<n_{i-1}>)$. Initially, $NF_{Total0} = 1$ and $A_0 = 1/F_0$, where $F_0$ is the Fano factor of light out of the transmitting laser ($A_0 = 1$ for a shot-noise limited source).

At step 306, an optical SNR at the receiver is determined. The optical SNR at the receiver is given by $SNR_k = NF_k^{Total}/SNR_0$ for a path containing a chain of k elements.

At step 307, it is determined whether the optical SNR for the path route that was determined in the previous step is equal to or greater than the one required by the receiver. If not, control proceeds to step 303, otherwise control proceeds to step 308.

At step 308, a bit error rate is determined based on the optical SNR determined in step 306, parameters of the transmitter, and parameters of the receiver.

At step 309, it is determined whether the bit error rate for the path is within a predefined range. If the bit error rate for the path is outside the predefined range, control proceeds to step 303. If the bit error rate is within the predefined range, control proceeds to step 310. At step 310, the path is validated.

FIG. 4 is a flow chart illustrating a method for validating a path through a switched optical network according to the second embodiment of the present invention.

At step 401, parameters at the transmitter are determined. According to this embodiment of the present invention, transmitter's average number of photons per bit $<n_0>$ and optical $SNR_0$ and Fano factor are determined.

At step 402, parameters at the receiver are determined. According to an embodiment of the present invention, the parameters at the receiver include the required optical SNR (that corresponds to a required bit error rate, which also depends on pulse-shape integrity and power, detector bandwidth and thermal noise properties, decision threshold, etc.) and the number of detected modes M for a given bit rate. The list of the prohibited "nearest neighbor NEs" is empty following this step.

At step 403, the next "(i+1)-th" NE that can be reached from the present "i-th" NE (or the original transmitter) by a single hop along a tentative path route through a switched optical network is generated. The single hop route to the next NE may be generated using any known route-generating algorithm. It is possible to specify to a procedure in this step (not shown on FIG. 4) a list of "nearest neighbor NEs" that should not be picked as the next NE (this is done to prevent the hop-by-hop routing procedure from running into loops). The next step in this algorithm will be performed at the next NE (i.e., "i" is incremented).

If the list of the prohibited "nearest neighbor NEs" includes every plausible nearest neighbor, "i" is decremented and the same step is performed at the previous NE. If the previous NE is the transmitter itself, the control passes to step 413 (not shown on FIG. 4).

At step 404, a noise figure $NF_i^{Poisson}$ is determined for the current NE on the tentative path (including calculation on behalf of any attached links and devices that are incapable of performing the calculation). According to this embodiment of the present invention, the noise figure for the NE may be stored or computed inside the NE based on vendor's proprietary algorithm that may or may not take into account the average number of photons per bit (and maximum permitted average power or number of channels) at the NE's input $<n_{i-1}>$ and the mode parameter M at the receiver, which were passed from the previous NE by the signaling protocol. Alternatively, $NF_i^{Poisson}$ may be computed based on parameters $n_i^{eq}$, $G_i$, $V_i$ that are associated with every device in addition to $<n_{i-1}>$ and M, as stated in the first embodiment, according to a formula:

$$NF_i^{Poisson}=2n_i^{eq}+1/G_i+[1+n_i^{eq}V_iG_i][Mn_i^{eq}/(G_i<n_{i-1}>)].$$

At step 405, a total noise figure is determined for the path route up to and including the present NE based on the total noise figure up to and including the previous element $NF_{i-1}^{Total}$, average number of photons $<n_{i-1}>$, and the cumulative products of excess noise coefficients and gains: $g_1 \ldots g_{i-1}$ and $G_1 \ldots G_{i-1}$. Using these four numbers and the M-parameter, the $NF_i^{Total}$, $<n_i>$, $g_1 \ldots g_{i-1}$ and $G_1 \ldots G_i$ can be determined, which will be passed on to the next element along the tentative path route by the signaling protocol. According to an embodiment of the present invention, the total noise figure is computed as $NF_i^{Total}=NF_{i-1}^{Total}+A_{i-1}(NF_i^{Poisson}-1)$, where $A_i \equiv A_{i-1}(g_i/G_i)$ is also defined recursively with excess noise factor $g_i=1+M(n_i^{eq}/<n_{i-1}>)$ as stated in the first embodiment. Here, $NF_i^{Poisson}$ and $n_1^{eq}$ are as determined in the previous step.

At step 406, an optical SNR at the output of the present element is determined. The optical SNR is given by $SNR_i=NF_i^{Total}/SNR_0$ for a path containing a chain of i elements and a transmitter with $SNR_0$.

At step 407, it is determined whether the optical SNR for the path route that was determined in the previous step is equal to or greater than the one required by the receiver. If not, the control passes to step 414, otherwise control proceeds to step 408.

At step 414, the current element is added to the list of prohibited "nearest neighbor NEs", "i" is decremented and control returns to step 403, which will now be performed at the previous NE.

At step 408, it is determined if the intended receiver has been reached. If not, control returns to step 403, otherwise it proceeds to step 409.

At step 409, a bit error rate is determined by the receiver based on the optical SNR determined in step 406, parameters of the transmitter, and parameters of the receiver.

At step 410, it is determined whether the bit error rate for the path is within a predefined range. If the bit error rate for the path is outside the predefined range, control proceeds to step 411, otherwise control proceeds to step 412.

At step 411, signaling control commands may be issued by the receiver that go back to all or some elements along the tentative path to adjust the transmission parameters. Examples of such commands may be directives to change transmission power (i.e., $<n_0>$) or chirp, or adjust dispersion compensating devices inside those elements that have such capabilities. If no such capabilities are present in any of the elements, the control passes to step 413. If, however, such capabilities are present on all or some of the elements, the relevant transmission parameters are altered and control passes back to step 401.

At step 412, path connection is validated.

At step 413, path connection fails.

FIGS. 3 and 4 illustrate flow charts describing a method for managing and validating paths through a switched optical network according to embodiments of the present invention. Some of the steps illustrated in these figures may be performed sequentially, in parallel or in an order other than that which is described. It should be appreciated that not all of the steps described are required to be performed, that additional steps may be added, and that some of the illustrated steps may be substituted with other steps.

In the foregoing specification the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than restrictive sense.

Appendix

PHYSICAL CONSTRAINTS AFFECTING CONNECTIVITY IN THE DYNAMIC OPTICAL NETWORK

D. Levandovsky, S. Makam, V. Sharma

*Tellabs Operations Inc., 4951 Indiana Ave., Lisle, IL 60532*

Phone: (630) 512-7386; E-mail: Dmitry.Levandovsky@tellabs.com

ABSTRACT

One important aspect of a DWDM-based optical network is its scalability. This usually means the ability to grow network capacity (e.g., adding more WDM channels to some fibers and providing additional nodes and connectivity) in small increments. Scalability of a network to very large capacities is made possible by the presence of optical cross-connects and wavelength converters, which permit a very large number of possible network topologies. The selection of an optical channel route through such a network must depend on the following factors:

1. The source and destination addresses or ports.

2. The type of protection and auto-recovery the network must provide in case of equipment and/or link failure.

3. Quality of service expected (in terms of bandwidth size, bit error rate, etc.).

4. State of the network (i.e. network availability and connection blocking probabilities).

We shall concentrate mainly on item 3 above, which deals with physical constraints limiting the possible light paths that may be provided by the network. One way to guarantee quality of service is to architect a network topology in such a way that every physically realizable light path delivers an adequate level of performance with no impact on any other light path. However, the resultant network design is often too inflexible and expensive to be considered for a practical implementation on a large scale. An alternative method would be to establish a set of guidelines (i.e. engineering rules) based on the desired quality of service and on the physical limitations of the network elements and fiber link parameters, which will be used in selecting a possible light path through a connection-rich network. The amount of recent activity in attempting to define a standard way for rapid on-demand establishment of light paths through an optical multi-

Appendix wavelength network indicates the need for these rules to be built into the very protocol that is used to discover and provision such light paths.

In this paper, we propose a set of engineering rules that will guide the possible light circuit
5   establishment based on the specified quality of service. We also discuss some of the proposed signaling protocols for establishing dynamic paths through optical networks from the point of view of their capability to implement these engineering rules.

INTRODUCTION

10  Recently, a lot of activity in the optics industry has been directed towards enabling optical networks to perform automatic end-to-end wavelength routing. The goal of such an Automatically Switched Optical Network (ASON) is to allow client network devices to dynamically request bandwidth from the optical network on an "as needed" basis[1]. The optical network consists of transmission and switching equipment that can provide point-to-point
15  connection service to the attached client terminals. These connections can be of various sizes, such as a whole wavelength (supporting arbitrary signal encoding), a SONET or GBE-encoded leased line, or a time-slot (i.e., a fraction) of a SONET line. Typical client network devices requesting services from such a network include SONET ADMs and MUXs, ATM switches, and IP routers. Such dynamic control of the optical network is becoming feasible owing to the
20  imminent availability of the transparent optical switching devices, which may be used as the intelligent routing elements in such a network. In this paper we concern ourselves with transparent wavelength connections across ASON as shown in Figure 1 below. We are not attempting to address the problem of optimum resource allocation in the ASON, such as minimizing the channel request blocking rates, etc. Those issues have recently been investigated
25  in numerous papers (see for instance [2,3,4]). We are only concerned here with establishing whether or not a given light path, however it might be chosen, is capable of delivering the performance expected of it by the client devices.

Appendix

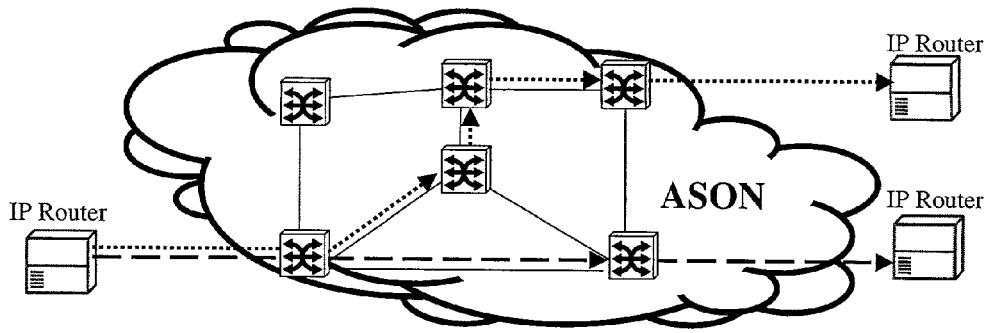

Figure 1. ASON shown with several IP routers connected by switched wavelength connections.

ISLANDS OF TRANSPARENCY

5  One way to satisfy physical constraints in the ASON is to divide it into a set of smaller sub-networks, as shown in Figure 2.

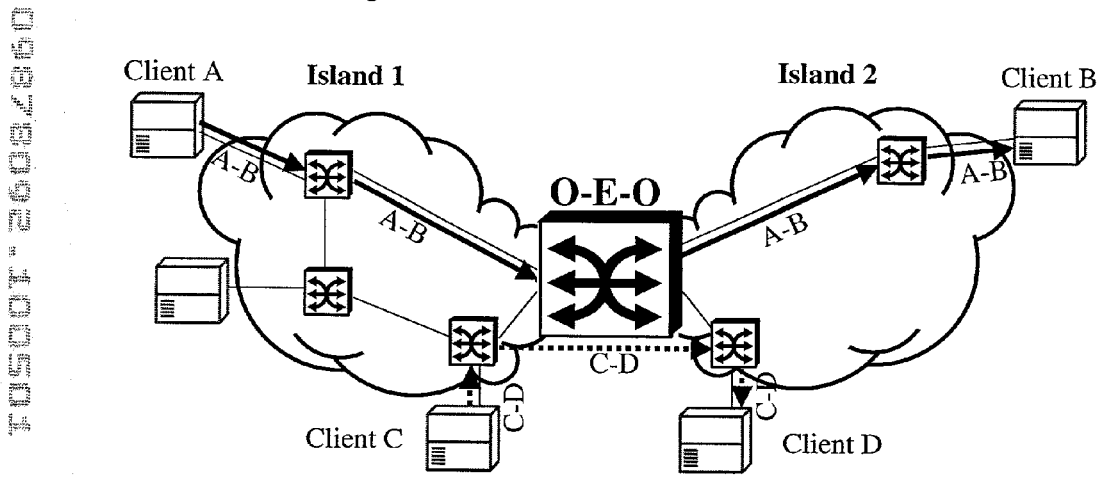

Figure 2. ASON shown with two "islands of transparency" connected by means of OEO. The figure
10  illustrates how clients "C" and "D", which are geographically close to one another, would benefit if a transparent connection "C-D" were made available.

Every sub-network constitutes a small "island-of-transparency", where every path, which does not exceed a certain maximum distance and a certain number of maximum hops, is capable of delivering some universally acceptable quality of service. The sub-networks are interconnected
15  via Optical-Electronic-Optical (OEO) cross-connects, which are capable of regenerating the signals in the electronic domain, thereby eliminating the undesirable optical transmission

Appendix impairments[5]. An ASON network based on the "islands-of-transparency" metaphor is very simple to plan, but the resultant network design will be costly due to the large number of OEO devices that are needed. This is because all network clients, including the ones that may be close to each other geographically, that reside in different "islands" will have to establish a path through the OEO as shown in Fig. 2 (path A-B).

Since an all-optical switching technology is expected to be far more economical in routing wavelengths inside an ASON, it is desirable to allocate OEO functionality in a more flexible manner. Namely, the route selection software must be capable of figuring out whether or not a given path between two network clients can be established transparently and with the desired quality of service. In case no such transparent path is possible, the chosen route shall have to traverse an OEO. However, if such a path exists and is available (path C-D in Fig. 2), then the OEO may be bypassed. This method is much more flexible than the "islands-of-transparency" one, as it permits one to use fewer OEOs, which may be placed at strategically selected locations throughout the ASON. One may still choose to break down the ASON into multiple sub-networks, but the choice will now be based on administrative or business considerations rather than physical constraints. Hence, we shall concentrate on the methods that may be employed in estimating the quality of service for a transparent connection through such an ASON.

PHYSICAL CONSTRAINTS AS THE BASIS FOR ROUTE SELECTION

Preliminary Assumptions

In evaluating a potential wavelength channel one must consider the effects of Self-Phase Modulation (SPM), Group Velocity Dispersion (GVD) and Polarization Mode Dispersion (PMD) as these tend to broaden (or sometimes compress) the propagating optical pulses, which eventually leads to neighboring bits interfering with each other and thus causing additional nonlinear mixing effects. Such inter-symbol interference is usually avoided by using careful dispersion and optical power management along the transmission path. In this treatment we assume that the intended light transmission path is properly dispersion-managed. This means that the fiber GVD and/or PMD is periodically compensated to ensure an acceptable level of pulse shape distortions at the receiver. It is typically accomplished via dispersion-compensating devices at (some of) the amplifier sites. The accuracy and periodicity with which dispersion is required to be balanced at every such site is dependent on the desired bit rate and the type of fiber used on the

Appendix links involved. It is assumed that the route selection algorithm will keep track of the dispersion and its management on every transmission link in the path for the purposes of pulse-shape management. In particular, for a given bit rate (i.e., pulse power level) and wavelength, the maximum distance between the dispersion compensating devices, the maximum permitted dispersion deviation (and the associated dispersion power penalty), and the maximum distance between electronic regenerators must be established and must be made available to the route selection software.

In addition we assume that the optical network operates in a steady state. By this we mean that the effect of optical power transients (usually caused by various wavelength channels turning their powers "on" or "off") on gain parameters of the optical amplifiers in the system is not considered. In practice this means an additional physical constraint on the transient suppression performance (i.e., time constant) of the optical amplifiers. The required transient recovery time is inversely proportional to the number of amplifiers in the chain, and, therefore, must also be validated by the route selection software[6].

All of the above mentioned constraints are considered verified (by the route selection software) and satisfied before the algorithm described in the rest of this section is applied.

Optical quality of service attribute

The main idea is to use a simplified method for estimating the quality of service for a given tentative connection before it is admitted into the switched optical network. In a circuit switched network, such as the ASON, where a light path is expected to carry a digital payload only, the quality of service attribute of interest is the Bit Error Rate (BER). Consequently, our task is reduced to proposing a scheme, which provides a fair estimate of the BER across the network for a light path with a given optical bandwidth. This approach reflects the fact that fiber attenuation and dispersion, being compensated for by the optical amplifiers and dispersion compensating devices, is not the dominant factor in analyzing the performance of a given light-wave circuit.

In general, in a static optical network, such as in existence today, the optical design parameters for a given route are chosen, depending on the fiber type, available amplifier sites, the number of wavelengths and desired bit-rate per wavelength. The prospective design of the optical transmission line must be carefully simulated on a high-speed digital computer in order to establish if the desired BER can be achieved.

Appendix

Such custom route-optimized approach is not feasible in a switched network environment, since such simulations require extensive use of computational resources making the approach slow and prohibitively expensive to be used on a call-by-call basis. Moreover, even if such careful simulations could be carried out for every circuit setup, a lot of the design parameters are not known, since in a dynamic network they may change as soon as another light circuit is added on the same physical link or switch node in a network. This would force one to plan for the worst possible network scenario in the analysis software, (e.g., highest possible optical power losses, largest allowable average powers in every link, etc.) which negates the whole purpose for doing such careful simulation in the first place.

In our proposal, such unpredictability is taken into account by assuming the worst-case scenario in some cases (e.g., power levels) and using accurate estimates in others (power loss etc.), as will be shown below.

BER Estimation Algorithm

Before a circuit is admitted into the network one must estimate the BER for the connection. The BER will depend on the amount of power launched into a fiber on a particular carrier wavelength $\lambda_k$, the amount of noise added by the transmission and switching facilities, and the quality of the receiver on the other side of the connection.

Let us first consider the noise added by the transmission and switching facilities. We shall assume here that a transparent wavelength connection is desired between two points in the network. These points may be customer sites or OEO regenerators placed between separate administrative domains in the network or a combination of the two. The sources of noise in the optical switching facilities (transparent optical switches are assumed here) may be broadly classified as:

- cross-talk – added to the signal by light scattered from other channels present in the optical cross-connect,

- optical loss – reduction of signal power upon transmission through the cross-connect which is also detrimental to the BER.

The switching facilities referred to above include transparent Optical Cross-Connects (OXC)s and Optical Add-Drop Multiplexers (OADM)s that are used to route wavelengths through the network.

Appendix

The transmission facilities typically include optical fiber and optical amplifiers, such as the ones based on Er-Doped Fibers (EDFA)s or Raman Effect (REA)s. The principal sources of noise in optical fibers, in addition to Amplified Spontaneous Emissions (ASE) in gain fibers, are due to non-linear scattering and wave mixing[7]. These are:

- Stimulated Brillouin scattering (SBS),
- Stimulated Raman scattering (SRS),
- Cross-phase modulation (XPM),
- Four-Wave mixing (FWM),
- Noise-induced timing jitter (see Footnote [i] later).

In addition one must consider the effects of dispersion in evaluating the net contributions of these non-linear impairments, since the amount of noise added via some of these effects depends on the interaction length between multiple simultaneous bits that may be traveling on different wavelengths in the same piece of fiber (e.g., as in a WDM system). This is in addition to the dispersion management considerations affecting the signal pulse shapes that were discussed earlier.

Let us now discuss how one may approach the task of estimating the BER along such a route. The principal quantity of interest along the path is the optical Signal to Noise Ratio ($SNR_o$), given in photon number units as[8]:

$$SNR^o(z) = \frac{[\langle n(z) \rangle - \langle n(z) \rangle_{EXE}]^2}{\sigma^2} = \frac{G^2(z)\langle n(0) \rangle^2}{\sigma^2}, \quad (1)$$

where $n(z)$ denotes the total number of photons at a point "z" along the path with $\langle ... \rangle$ indicating a time average over one bit time interval, $n(z)_{EXE}$ – the total number of photons in the excess noise associated with a given signal, and $\sigma^2$ denoting the variance (i.e., the noise power) measured during the interval. The optical power gain or loss at a given point along the path route relative to input $z=0$ is denoted by $G(z)$. Eq. (1), therefore corresponds to a signal to noise ratio of a single bit, which at this point remains unspecified (a "1" or a "0"). Squared photon number units are in deference to electrical signal to noise ratios, which use electrical powers, thus being proportional to optical powers squared. Use of photon numbers instead of optical powers is more convenient at this point because it avoids making the treatment dependent on the bit rate, and the photo-detector integration constant. For signals with Poisson statistics (so called shot-noise limited signals), $<n(z)> = \sigma^2$, and $<n(z)>_{EXE} = 0$, which makes $SNR^o = <n(z)>$. The principal idea, therefore, is to treat the entire process of signal propagation from $z=0$ to $z=L$ as a quasi-linear distributed

Appendix amplification process (for a given fixed set of optical powers along the transmission path) where the net contribution of all the non-linear interactions (and the spontaneous emissions inside the optical amplifiers) are reflected in the degradation of the $SNR^o$. In this representation, therefore, the entire signal path is a chain of lumped or distributed amplifiers with lossy elements in between, or a single fiber amplifier, whose emission and absorption coefficients follow a periodic (or even discontinuous) distribution along the length. A loss (as in fiber during propagation) is possible in this model as we shall allow $G(z)$ to dip below the value of one. To guarantee the validity of our approach a certain set of constraints must be met on every link in the transmission path, as we shall discuss below. In other words, we are treating the entire noise propagation problem (normally done via detailed computer simulations) via linearization approximation around the relevant transmission system parameters that are likely to prevail in the network. The results of the simulations will be needed to establish the values of the aforementioned transmission system parameters. If we are accurate in the parameter estimation process, the approach is likely to result in a good estimate of the BER. The excess noise, represented here by $n(z)_{EXE}$ refers to an additional noise generation process inside a transmission or switching device. Its exact probability distribution is not necessarily known except for its main features – the mean and the variance. This excess noise itself may consist of various contributions, some stemming from the amplified spontaneous emission process inside the EDFA, others due to four-wave mixing in the fiber etc. The measure of excess noise in an optical signal is given by the Fano factor:

$$F(z) = \frac{\sigma^2(z)}{\langle n(z) \rangle}, \tag{2}$$

which is equal to one for the shot-noise limited signal. We shall characterize every device in the transmission path, be it passive fiber, active optical amplifier or an OXC by its associated noise figure, conventionally defined as (here $z=0$ is assumed to correspond to the device input):

$$NF^o(z) = \frac{SNR^o(0)}{SNR^o(z)}. \tag{3}$$

Presumably, a set of noise figures would be computed for every device in the network for several operating scenarios. Let $M$ be the total number of modes detectable by the photo-detector at the end of the line (spatial, polarization or frequency), so that $<n(z)>_{EXE}=MN(z)$. The idea here is that the desired signal is carried by only one out of $M$ detected modes. The noise, however, can be

Appendix introduced via all $M$ modes[i]. It is convenient to introduce the equivalent input noise factor, given by:

$$n^{eq}(z) = \frac{N(z)}{G(z)},$$

which corresponds to the equivalent average number of noise photons on the input per mode.

Let us first consider an EDFA. For the case of linear amplification of a single wavelength channel its $NF^o$ may be shown to be of the form:

$$NF^o = \frac{SNR^o(0)}{\langle n(0)\rangle}\left[F(0)-1+2n^{eq}+\frac{1}{G(z)}+\frac{Mn^{eq}}{G(z)\langle n(0)\rangle}\left(1+n^{eq}VG(z)\right)\right], \quad (4)$$

where $n^{eq}=n^{sp}(z)-1/G(z)$. $n^{sp}$ is commonly referred to as the spontaneous emission factor, which is equal to 1 for an ideal amplifier (with complete medium inversion), and $N(z)$ takes on the meaning of the per mode amplified spontaneous emission photon number. The $V$ parameter is equal to one for a linear amplifier, and its meaning shall be explained later. Note that for a shot-noise-limited input $SNR^o = \langle n(0)\rangle$ and $F(0)=1$; furthermore, typically, in a realistic situation $G(z)>>1$ and $G(z)\langle n(0)\rangle >> N(z)$ consequently $NF^o(z)=2n^{sp}(z)$ (i.e., the commonly known 3dB limit). We can use the expression in Eq. (4) as the basis for our estimation. For "ideal" (i.e., linear) lossy fiber spans where $G(z)<1$, we shall set $n^{eq}=0$, so that for a shot-noise-limited input we shall have $NF^o=1/G(z)$, as expected. In a realistic situation, however, fiber (including gain fiber) is not linear and, therefore, in our linearized treatment adds excess noise. The noise referred to includes four-wave-mixing, cross-gain modulation in an amplifier with multiple wavelength channels, SBS, SRS, etc. The equivalent noise power, represented here by $n^{eq} \neq 1$ depends on the optical power per wavelength, number of wavelengths simultaneously present, fiber dispersion parameter (which depends on pump power and signal power for gain fiber). Since the

---

[i] It may also be desirable to keep track of the path averaged excess noise (an additional physical constraint parameter), defined as $$\overline{\langle n(z)\rangle}_{EXE} = \frac{1}{L}\int_0^L \langle n(z)\rangle_{EXE} dz, \quad (F1)$$

since in an ultra-long-haul communication systems these random intensity fluctuations will couple (via SPM) to carrier frequency noise, which results in additional pulse timing jitter at the output. The timing jitter induced by amplifier ASE on optical pulses called solitons is known as the Gordon-Haus timing jitter and can be an important source of bit errors.

Appendix number of wavelengths, and hence the total power, are subject to change at any time in a switched optical network, one should use a worst-case scenario (maximum number of wavelength channels present) to obtain $n^{eq}$ for every transmission element. Eq. (4) implicitly assumes that this additional noise has an ASE-like statistical nature, (i.e., a variance as in the Bose-Einstein
5   distribution). This is also a very conservative estimate. If it is felt to be too conservative the V-parameter may also be adjusted for a given transmission element (i.e., for an optical amplifier with no photons on the input $\sigma^2(z) = N(z) + VN^2(z)$, thus setting V=0 makes it closer to Poissonian, whereas setting it equal to 1 makes it like Bose-Einstein). One may also extend this method to distributed amplifiers, where the signal is amplified as it propagates along the
10  transmission fiber. This is relevant to the case of Raman amplifiers, which are gaining acceptance in the ultra-long haul transmission market segment. In that case the equivalent noise factor may be shown to be:

$$n_+^{eq} = \frac{a_0}{\alpha'_k}\exp\left(-\frac{a_0}{\alpha'}\right)\left\{Ei\left(\frac{a_0}{\alpha'_k}\right) - Ei\left(\frac{a_0}{\alpha'_k}\exp(-\alpha'_k z)\right)\right\}, \qquad (5)$$

15
$$n_-^{eq} = 1 - \frac{1}{G} + \frac{\alpha'_k}{a_0}\left(\exp(\alpha'_k z) - \frac{1}{G}\right), \qquad (6)$$

with the noise figure for Poissonian input as before: $NF_\pm^o \approx 1 + 2n_\pm^{eq}$. The two values of $n^{eq}$ in Eqs. (5) and (6) above correspond to forward and backward pumping configurations with $\alpha_\kappa'$ -- a fiber absorption coefficient, which is assumed approximately the same here for the signal and the
20  pump wavelengths, and $Ei(x)$ is the exponential integral function.

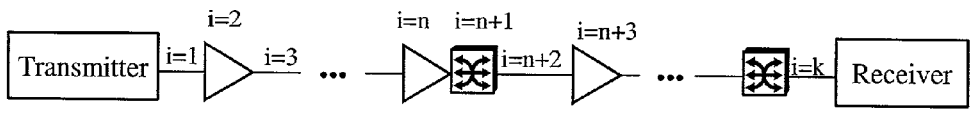

Figure 3. Chain of optical transmission elements.

25

Let us now consider a chain of such gain/loss elements as our complete transmission path (see Figure 3 above). It is evident from the definition of the noise figure that the total noise added by such system can be characterized via $NF_k^{Total} = NF_1\ NF_2\ ...NF_{k-1}\ NF_k$ for a chain consisting of $k$ elements. The definition of the noise figure, however, depends on a state of the signal at the input
30  to the device (characterized by $SNR^o(0)$), which evolves in our situation from one element in the

Appendix chain to the next. Defining the noise figure with respect to a Poissonian input state, therefore, would make it independent of its position in the chain and would make it useful as a surrogate for the devices' aggregate noise performance. Setting $SNR^o(0)=<n(0)>$ and $F(0)=1$ in Eq. (4), we write for the "i'th" transmission element in the chain:

$$NF_i^{Poisson} = 2n_i^{eq} + \frac{1}{G_i(z)} + \frac{Mn_i^{eq}}{G_i(z)\langle n_{i-1}\rangle}\left(1 + n_i^{eq}V_i G_i(z)\right), \tag{7}$$

where $n_i^{eq}$ is the equivalent input noise factor for that particular element, $V_i$ -- a parameter for the element as discussed earlier, and $<n_{i-1}>$ is the input number of photons. With this definition the noise figure for a chain of transmission elements may be shown to be:

$$NF_k^{Total} = \frac{\langle n_0 \rangle}{\sigma_0^2}\left\{F_0 - 1 + NF_1^{Poisson} + g_1\frac{NF_2^{Poisson}-1}{G_1} + g_1 g_2\frac{NF_3^{Poisson}-1}{G_1 G_2} + \ldots + g_1 g_2 \cdots g_{k-1}\frac{NF_k^{Poisson}-1}{G_1 G_2 \ldots G_{k-1}}\right\}, \tag{8}$$

with $$g_i = 1 + M\frac{n_i^{eq}}{\langle n_{i-1}\rangle}, \tag{9}$$

and $$\langle n_i \rangle = G_1 G_2 \ldots G_i \langle n_0 \rangle + M\left[G_1 G_2 \ldots G_i n_1^{eq} + G_2 \ldots G_i n_2^{eq} + \ldots + G_i n_i^{eq}\right]. \tag{10}$$

Eq. (8) can also be written recursively as:

$$NF_i^{Total} = NF_{i-1}^{Total} + A_{i-1}\left(NF_i^{Poisson} - 1\right), \tag{11}$$

with $A_i \equiv A_{i-1}(g_i/G_i)$. The average number of photons at the "$i$-th" input in Eq. (9) can also be computed recursively: $\langle n_{i-1}\rangle = G_{i-1}(\langle n_{i-2}\rangle + n_{i-1}^{eq})$ with $\langle n_1 \rangle = G_1(\langle n_0 \rangle + Mn_1^{eq})$. Initially we set $NF_0^{Total}=1$ and $A_0=1/F_0$, where $F_0$ is the Fano factor of light out of the transmitting laser ($A_0=1$ for a shot-noise limited source).

It is obvious from Eqs. (8) and (9) that it is very important to have low values of $NF_i$ and $g_i$ for smaller values of "$i$" (i.e., its important to have a low noise transmitter with enough power and low noise fibers/amplifiers early in the chain). The latter should be the major consideration in the routing software's algorithm, which is used to select the physical medium for the signal transmission. In the case where the signal to each element dominates the noise (i.e.,

Appendix $\langle n_{i-1} \rangle \gg n_t^{eq}$ and $g_t \approx 1$) and the input signal has Poisson statistics the cumulative noise figure may be written as:

$$NF_k^{Total} = NF_1^{Poisson} + \frac{NF_2^{Poisson}-1}{G_1} + \frac{NF_3^{Poisson}-1}{G_1 G_2} + \ldots + \frac{NF_k^{Poisson}-1}{G_1 G_2 \ldots G_{k-1}}, \qquad (12)$$

which is the well known Friis' formula widely used for electronic amplifier chains. Once the overall noise figure is computed one may estimate the BER at the photo-detector. The process involves accounting for all the noise sources at the photo-detector and depends on the design details. The BER can be computed on the basis of the $Q$ parameter (widely known as Personick's Q-factor), defined as:

$$Q = \frac{\langle i_1 \rangle - \langle i_0 \rangle}{\sqrt{\sigma_1^2} + \sqrt{\sigma_0^2}}, \qquad (13)$$

where $\langle i_1 \rangle$ and $\langle i_0 \rangle$ refer to average photo-currents corresponding to bits 1 and 0, respectively, whereas $\sigma_1^2$ and $\sigma_0^2$ refer to the corresponding variances. The latter depend in general on the optical noise power, detection responsivity, ratio of the optical to electrical bandwidth, as well as the thermal noise added by the photo-detector/amplifier of the receiver circuit. The BER is easily obtained from the $Q$ factor via:

$$BER = \frac{1}{2} erfc\left(\frac{Q}{\sqrt{2}}\right). \qquad (14)$$

The value of $Q=6$ is required for a BER of $10^{-9}$. For a simple case of identical noise variances $\sigma_0^2 = \sigma_1^2$ for zeros and ones (which may happen in an unlikely case where thermal noise dominates all other noise sources), the signal to noise ratio is given by $SNR=4Q^2$. In any case, every optical receiver will have some required $SNR$ in order to achieve the value of $Q=6$.

NETWORK CONTROL CONSIDERATIONS

Based on the results of the previous section one may estimate the BER for a given connection. The procedure to use is as follows. Given the desired bit rate, the acceptable BER, and receiver parameters (e.g., ratio of the electronic to optical bandwidth, receiver power penalty, etc.) one determines the optical $SNR$ required before the detection as well as the $M$-parameter (which depends on the bit rate that is going to be on this particular channel). Subsequently, the

Appendix expression in Eq. (8) or (11) is used to verify that the desired performance is attained. This could be arranged in one of two ways:

1. via extending topology distribution protocol or
2. through signaling protocol extensions.

The first method involves distributing all the physical constraints when the network is assembled and powered up. Since IP style of control is currently being adopted for optical networks, the existing link advertisement protocols, such as OSPF or IS-IS need to be extended in order to associate the physical parameters with every piece of transmission equipment in the optical network. These parameters will include a range (or ranges) of optical powers together with the associated ($n_i^{eq}$, $V_i$, $G_i$) for every piece of transmission equipment in the network as well as an $M$ parameter associated with every receiver for any given bit rate. As mentioned before, the equipment must be assumed to be carrying the worst-case load on all wavelengths except for the one being considered for this connection. Consequently, a source node will be able to use Eq. (8) in order to determine if a given connection meets the performance requirements and should be admitted to the network. ($n_i^{eq}$, $V_i$, $G_i$) must be chosen carefully for the expected average input power levels for every link so as to result in realistic (erring on the conservative side) estimates for the noise figure. In the cases where average input optical powers are not known ahead of time for a given link, one can use "$k$-th" order polynomial expansion of the form $X_i = X_i^0 + X_i^1 <n_{i-1}> + X_i^2 <n_{i-1}>^2 + \ldots + X_i^k <n_{i-1}>^k$, where $X_i$ is one of ($n_i^{eq}$, $V_i$, $G_i$). In these cases $k=5$ or $6$ is expected to be more than adequate in most situations. Simulations must be used to assign values to the aforementioned parameters for all different types of devises in the ASON.

The second way involves a signaling protocol, such as an appropriately extended version of RSVP or CR-LDP in order to validate the quality of the proposed connection. The extensions needed are necessary to enable hop-by-hop distributed route selection possible. In this scenario, the aforementioned physical constraints are not distributed to every routing element in the network, but rather stored in the transmission equipment involved. For instance, an OXC or an OADM may keep the parameters for itself and every fiber link attached to its ports in its own internal configuration memory. In this case the algorithm will take advantage of the recursive nature of Eq. (11) with every device responsible for calculating its own optical noise figure and updating the "running total," using Eq. (11), which is passed along to the next routing element in the chain. The parameters to pass in this case are: the noise figure so far $NF_i^{Total}$, average number of photons $<n_i>$, and the cumulative products of excess noise coefficients and gains:

$g_1...g_i$ and $G_1....G_i$. Using these four numbers and the $M$-parameter, the $NF_{i+1}^{Total}$, $<n_{i+1}>$, $g_1...g_{i+1}$ and $G_1....G_{i+1}$ can be determined. This procedure must terminate when a receiver is reached or the resultant optical $SNR$ gets outside the desired range. If the latter condition is reached the signaling protocol will have to back track some number of hops and start exploring another possible route for the connection. This is similar to the signaling capabilities of the PNNI network protocol specified for use in the ATM networks. The advantage of this approach is that the noise-figure calculation for a given element is done locally and could employ a more sophisticated and precise method than the one employed in Eq. (7). This method may be entirely proprietary and implemented internally by an equipment vendor. Also, certain OXC designs will have different physical attributes (e.g., optical losses) depending on which pair of ports is picked for the connection. With this method, actual numbers could be used instead of worst-case estimates for such OXCs. Moreover, the deterioration in noise performance (e.g., increased optical losses due to aging etc.) could also be kept in check locally with greater simplicity (in the first approach they would have to be advertised periodically to every routing node in the network). The down side of this method, of course, is the fact that it requires a more sophisticated signaling protocol, which permits such hop-by-hop route reservation with the added attributes.

The ultimate decision on whether a given path satisfies all the performance requirements must be made on the receiving end, where the final BER is computed. The receiver, therefore, is expected to send the final reservation message, which is used to turn on the connection at every intermediate routing node.

---

[1] See for instance: http://www.odsi-coalition.com/odsi_docs/odsiFunctSpecApril21.doc

[2] Ramamurthy B, Datta D, Feng H, Heritage JP, Mukherjee B "Impact of transmission impairments on the teletraffic performance of wavelength-routed optical networks," *JOURNAL OF LIGHTWAVE TECHNOLOGY 17 (10), 713-1723, OCT 1999*

[3] M. Alanyali, E. Ayanoglu, "Provisioning Algorithms for WDM Optical Networks," *Proceedings of the IEEE INFOCOM 1998, San Francisco, CA, April 1998, pp.910-917*

[4] Sabella R. et al, "Impact of Transmission Performance on Path Routing in All-Optical Transport Networks," *JOURNAL OF LIGHTWAVE TECHNOLOGY, 16 (11), 1965-1971, NOV 1998.*

Appendix

[5] Saleh, A.A.M, "Islands of Transparency - an Emerging Reality in Multiwave Optical Networking," *1998 IEEE/LEOS Summer Topical Meeting on Broadband Optical Networks and Technologies, Monterey, CA, 20-24 July, 1998, p.36.*

[6] Sun Y, Srivastava AK, Zyskind JL, Sulhoff JW, Wolf C, Tkach RW, "Fast power transients in WDM optical networks with cascaded EDFAs" *ELECTRONICS LETTERS 33 (4), 313-314 FEB 13 1997.*

[7] Kaminow IP and Koch TL, "Optical fiber telecommunications" *Academic Press, 1997, ISBN: 0123951704 (v. A); 0123951712 (v. B)*

[8] Agrawal GP, "Fiber-optic communication systems," *New York, Wiley, 2nd ed., 1997, ISBN: 0471175404*

What is claimed is:

1. A method for selecting a path through a switched optical network comprising:
   identifying a bit error rate of paths through the switched optical network that include a noise figure for each element on the paths by
      determining an equivalent average number of noise photons per bit at an input of the element,
      determining an average number of photons per bit at the output of a previous element,
      determining an optical power gain of the element,
      determining a constant related to deviation of the statistical noise distribution, and
      determining a number of modes detectable at an end of the path by the receiver; and
   validating the path if the bit error rate is within a predefined range.

2. A method for selecting a path through a switched optical network, comprising:
   identifying bit error rates of paths through the switched optical network that include a noise figure for each element on the paths by
      computing $NF_i^{Poission} = 2n_i^{eq} + 1/G_i + \lfloor 1 + n_i^{eq} V_i G_i \rfloor \lfloor M n_i^{eq}/(G_i <n_{i-1}>) \rfloor$ where $n_i^{eq}$ is an equivalent average number of noise photons per bit added by the element, $V_i$ is a constant that accounts for deviation of a statistical noise distribution, $G_i$ is an optical power gain for the element, M is a number of modes detectable at an end of the path, and $<n_{i-1}>$ is the average number of photons at an output of a previous element in the path; and
   validating the path if the bit error rate is within a predefined range.

3. A method for selecting a path through a switched optical network, comprising:
   identifying bit error rates of paths through the switched optical network that include a noise figure for each element on the paths by computing $NF_i^{Total} = NF_{i-1}^{Total} + A_{i-1}(NF_i^{Poisson} - 1)$ for a path containing "i" elements, wherein $A_i \equiv A_{i-1}(g_i/G_i)$ is defined recursively with excess noise factor $g_i = 1 + M(n_i^{eq}/<n_{i-1}>)$; and
   validating the path if the bit error rate is within a predefined range.

4. The method of claim 3, wherein initially $NF_0^{Total} = 1$ and $A_0 = 1/F_0$, where $F_0$ is a Fano factor of light out of the transmitting laser and $A_0 = 1$ for a shot-noise limited source.

5. A method for validating a path through a switched optical network, comprises:
   determining an optical Signal to Noise ratio at an output of an element in the path that includes a total noise figure for a chain including all preceding elements up to an including a present element of the path by recursively computing $NF_i^{Total} = NF_{i-1}^{Total} + A_{i-1}(NF_i^{Poisson} - 1)$ for the path containing "i" elements, wherein $A_i \equiv A_{i-1}(g_i/G_i)$ is defined recursively with excess noise factor $g_i 1 + M(n_i^{eq}/<n_{i-1}>)$;
   modifying the path if the optical Signal to Noise ratio at the element is outside a predefined range; and
   validating the pat if the optical Signal to Noise ratio at the receiver are within a predefined range.

6. The method of claim 5, wherein a noise figure up to and including a previous element $NF_{i-1}^{Total}$, an average number of photons $<n_{i-1}>$ at an output of the previous element, and a cumulative products of excess noise coefficients $g_1 \ldots g_{i-1}$ and gains $G_i \ldots G_{i-1}$ are transmitted by the previous element to the present element.

7. A computer-readable medium having stored thereon sequences of instructions, the sequences of instructions including instructions which, when executed by a processor, causes the processor to perform:
   determining a bit error rate of paths that including a noise figure for each element on the paths comprising
      determining an equivalent average number of noise photons per bit at an input of the element;
      determining an average number of photons per bit at an output of a previous element;
      determining an optical power gain of the element;
      determining a constant related to deviation of a statistical noise distribution; and determining a number of modes detectable at an end of the path; and
   validating the pat if the bit error rate is within a predefined range.

* * * * *